(12) United States Patent
Uozumi et al.

(10) Patent No.: US 7,454,176 B2
(45) Date of Patent: Nov. 18, 2008

(54) SEMICONDUCTOR INTEGRATED CIRCUIT FOR COMMUNICATION AND TERMINAL DEVICE FOR MOBILE COMMUNICATION

(75) Inventors: Toshiya Uozumi, Takasaki (JP); Ikuya Ono, Takasaki (JP); Jiro Shinbo, Takasaki (JP)

(73) Assignee: Renesas Technology Corp., Tokyo (JP)

( * ) Notice: Subject to any disclaimer, the term of this patent is extended or adjusted under 35 U.S.C. 154(b) by 450 days.

(21) Appl. No.: 11/360,427

(22) Filed: Feb. 24, 2006

(65) Prior Publication Data

US 2006/0211390 A1    Sep. 21, 2006

(30) Foreign Application Priority Data

Mar. 15, 2005    (JP) ............................. 2005-072268

(51) Int. Cl.
*H04B 1/40*    (2006.01)
(52) U.S. Cl. .................. 455/84; 455/260; 455/333; 455/552.1; 375/376
(58) Field of Classification Search .................. 455/73, 455/84, 85, 86, 180.3, 255, 260, 307, 333, 455/552.1, 553.1; 375/219, 373, 376; 370/321, 370/345, 347, 442
See application file for complete search history.

(56) References Cited

U.S. PATENT DOCUMENTS

| | | | | |
|---|---|---|---|---|
| 4,525,686 A | * | 6/1985 | Yokoya | ........................ 331/17 |
| 5,852,784 A | * | 12/1998 | Ito et al. | .................. 455/552.1 |
| 6,295,442 B1 | * | 9/2001 | Camp et al. | .................. 455/102 |
| 6,516,023 B1 | * | 2/2003 | Kveim et al. | ................. 375/219 |
| 6,766,178 B1 | * | 7/2004 | Damgaard et al. | ........ 455/552.1 |
| 7,319,352 B2 | * | 1/2008 | Scheytt | ........................ 327/161 |

FOREIGN PATENT DOCUMENTS

| | | |
|---|---|---|
| JP | 11-168405 | 6/1999 |
| JP | 2003-087116 | 3/2003 |

* cited by examiner

*Primary Examiner*—Quochien B Vuong
(74) *Attorney, Agent, or Firm*—Mattingly, Stanger, Malur & Brundidge, PC

(57) ABSTRACT

The present invention provides a semiconductor integrated circuit for communication (RF IC) operable in a mode for receiving a received signal subjected to phase modulation and amplitude modulation and a mode for receiving a received signal subjected only to phase modulation. In the semiconductor integrated circuit for communication, a frequency band of a loop filter in a PLL circuit is switched and set so as to become large in a reception mode and become small in a transmission mode.

11 Claims, 10 Drawing Sheets

"INTEGER PLL"

"FRACTIONAL PLL"

SEMICONDUCTOR INTEGRATED CIRCUIT FOR COMMUNICATION AND TERMINAL DEVICE FOR MOBILE COMMUNICATION

CROSS-REFERENCE TO RELATED APPLICATION

The present application claims priority from Japanese patent application No. 2005-072268 filed on Mar. 15, 2005, the content of which is hereby incorporated by reference into this application.

BACKGROUND OF THE INVENTION

The present invention relates to a semiconductor integrated circuit for communication having a PLL (Phase-Locked Loop) circuit built therein, which generates a carrier wave signal supplied to a demodulator for demodulating an RF receive signal and a modulator for modulating a transmit signal, and a technique for selecting a frequency band of a loop for the PLL circuit. The present invention relates to, for example, a technique effective if applied to a semiconductor integrated circuit for communication mounted in a wireless communication apparatus like a cellular phone having a mode for modulating only a phase component and a mode for modulating a phase component and an amplitude component.

In a wireless communication system like a cellular phone, a semiconductor integrated circuit for communication (hereinafter called high-frequency or RF IC) has been used in which a receive signal or a transmit signal is combined with an RF local oscillation signal (carrier wave signal) by mixers to perform frequency downconvert or upconvert, and modulation for the transmit signal and demodulation for the receive signal are performed. In such an RF IC, a technique is used wherein a carrier wave signal combined with the receive signal and a carrier wave signal combined with the transmit signal are generated by a common PLL circuit and supplied to a mixer on the receiving side and a mixer on the transmitting side to thereby achieve a reduction in chip size.

In a wireless communication system of a recent GSM (Global System for Mobile Communication) or the like, a system is being put to practical use, which includes a mode called an EDGE (Enhanced Data Rates for GSM Evolution) having a 3π/8rotating8-PSK (Phase Shift Keying) modulation mode for modulating a phase component and an amplitude component of a carrier wave in addition to a GMSK (Gaussian filtered Minimum Shift Keying) modulation mode for modulating the phase component of the carrier wave, and wherein the modulation modes are switched to perform communications. Since the amplitude modulation is performed in the EDGE mode in addition to the phase modulation, data communications faster than the GMSK mode at the phase modulation alone can be carried out.

In the wireless communication system of the GSM system, a TDM (Time Division Multiple Access) system has been adopted as a multiplexing system. Transmit and receive data are managed in the form of a unit called a frame comprised of 8 time slots (hereinafter called simply slots). Allocating data of one user to, for example, one slot makes it possible to allow eight users to share one channel (frequency) at maximum.

In an EDGE system, a technique called dynamic link adaptation has been adopted which performs switching between data coding (coding/combining) processing and a modulation system according to the distance between a terminal device and a base station. When, for example, the distance to the base station increases, I and Q signals of a baseband are given data coding processing low in data rate but resistant to noise and then subjected to GMSK modulation. When the distance to the base station is short, the I and Q signals are given data coding processing susceptible to noise but high in data rate and then subjected to 8PSK modulation.

Further, in the GSM system, there has been proposed a function called DTM (Dual Transfer Mode) which inserts data modulated in a GMSK mode and data modulated in an EDGE mode into the same frame and performs communications as shown in FIG. 11. Cellular phones each having such a function are expected to increase from now on. Incidentally, "MNT" in FIG. 11 indicates a monitor processing period in which the distance between a terminal device and a base station is measured. The GSM system has been disclosed in a patent document 1 (Japanese Unexamined Patent Publication No. Hei 11(1999)-168405).

SUMMARY OF THE INVENTION

In a GSM standard, the GMSK mode and the EDGE mode are different in maximum signal level. It is considered that reception slots for GMSK-modulated data and EDGE-modulated data are continuous within one frame in the DTM mode. Therefore, a cellular phone having such a DTM function might need to switch gain of PGAs (high gain amplifiers) placed in a stage subsequent to a demodulation mixer every slots.

In particular, in a high-frequency or RF IC using a direct downconversion reception system which downconverts a receive signal close to 1 GHz without temporarily converting it into an intermediate frequency when the receive signal is converted to each signal lying in a frequency band in a baseband of a few 100 kHz by the demodulation mixer, the frequency of a demodulated signal on the output side of the mixer is far low as compared with the pre-demodulation signal and close to a dc current. When a DC offset exists in each path for the receive signal, it is amplified by the corresponding high-gain PGA, so that its output is saturated, thus causing the difficulty in amplifying the receive signal as expected.

Meanwhile, the DC offsets occur due to variations in elements constituting each mixer or PGA. Besides, the amount of variations differs according to the magnitude of gain to be set. Therefore, when the gain of each PGA is changed, there is a need to effect DC-offset calibration for each time. When the reception slots different in modulation mode are continuous within one frame in the case of the DTM, the gain of the PGA might be changed upon switching of the slots. In such a case, there is a need to perform calibration from the completion of reception of a given slot to the start of reception of the next slot. In the GSM standard, a guard period of 30.46 μs is allowed between adjacent slots. The calibration must be completed within this short period. A calibration circuit for the DC offset of each PGA, which has been implemented or embodied by the present applicant, is capable of calibration within such a time.

It has however been revealed that a power supply voltage varies with execution of the DC offset calibration of the PGA, and correspondingly, the frequency of an RF-PLL circuit (PLL frequency synthesizer) that generates a local oscillation signal (local signal) varies, thus causing a difficulty in allowing its variation to converge within the period of 30.46 μs. That is, it has been found out that the conventional receiving circuit having no estimated that the reception slot for the GMSK-modulated data and the reception slot for the EDGE-modulated data are continuous, is still accompanied by the problem that when the gain of each PGA is changed upon performing switching between the reception slots, it is not possible to allow the oscillation frequency of the RF-PLL circuit to converge till the head of the next slot where it is kept intact.

Incidentally, the expansion of a loop band is effective to allow the oscillation frequency of the RF-PLL circuit to converge in a short period of time. For example, the patent document 1 has disclosed the invention in which the loop band of the PLL frequency synthesizer is designed such that a satisfactory phase noise characteristic can be realized upon transmission and the loop band is made wide upon reception, whereby a frequency switching time prior to the start of reception can be shortened and average current consumption per frame can be reduced. When, however, the loop band is made wide, the phase noise of the local signal is deteriorated. Upon transmission, the deterioration of the phase noise of the local signal is not allowed. Thus, such a system that the loop band is made wide upon reception and the loop band is reduced upon transmission is effective.

On the other hand, the present inventors have discussed the use of a fractional type PLL circuit using a frequency divider capable of division at a decimal division ratio in place of an integer type PLL circuit using a frequency divider capable of division at an integer division ratio, which has heretofore been used in general as a PLL circuit for generating a local oscillation signal to omit an oscillator (IF-VCO) which generates a signal of an intermediate frequency used in step-up conversion of a transmit signal. As will be described later in detail, the fractional type PLL circuit can expand the loop band as compared with the integer type PLL circuit because the phase noise is low. Thus, the present inventors have considered that changing the RF-PLL circuit from the integer type to the fractional type makes it possible to allow variations in the frequency of the PLL circuit produced due to the variations in power supply voltage with the switching of the gain of each PGA to converge within a predetermined time interval, and the phase noise has satisfied design conditions.

However, as a result of further examinations, the present inventors have reached a conclusion that even if the fractional type PLL circuit is used, it is difficult to perform both transmission and reception while the loop band of the PLL circuit is being fixed, considering both the phase noise and the frequency convergent time of the PLL circuit at the gain switching of each PGA.

The present invention has been made under the above background. It is an object of the present invention to provide a semiconductor integrated circuit for communication (RF IC) capable of allowing variations in the frequency of a PLL circuit to converge within a predetermined time even though the switching of gain of each PGA is performed in mid course of reception, and allowing a phase noise characteristic and a transmission spectrum characteristic at transmission to satisfy a predetermined condition.

Incidentally, the invention described in the patent document 1 is similar to the invention of the present application in that the time required to perform frequency switching of the PLL circuit prior to the start of reception is shortened. As will be described later, however, the invention of the patent document 1 is aimed to reduce average current consumption per frame in the last result, whereas upon loop-band switching in a frequency domain, which is to be executed by the invention of the present application, the effect of reducing average current consumption per frame is low. Therefore, the invention of the present application does not correspond to the invention which can easily be made from the invention of the patent document 1.

The above, other objects and novel features of the present invention will become apparent from the description of the present specification and the accompanying drawings.

A summary of a representative one of the inventions disclosed in the present application will briefly be explained as follows:

There is provided a semiconductor integrated circuit for communication (high-frequency or RF IC), which comprises a down-convert mixer that combines a receive signal and a carrier wave signal, an up-convert mixer that combines a transmit signal and the carrier wave signal, and a PLL circuit common to transmission/reception that includes a voltage-controlled oscillator and supplies a carrier wave signal corresponding to a reception frequency and a transmission frequency to the two mixers, and which has a mode for processing receive signals subjected to phase modulation and amplitude modulation and a mode for processing the signal subjected only to the phase modulation, wherein a loop band for the PLL circuit is switched so as to be broad in a reception mode and to be narrow in a transmission mode. A fractional type PLL circuit using a frequency divider capable of division at a decimal division ratio may preferably be used as the PLL circuit.

According to the above means, since the loop band of the PLL circuit becomes wide in the reception mode, variations in the frequency of the PLL circuit are allowed to converge within a predetermined time even though the switching of gain of each PGA is performed in mid course of reception. Since the loop band of the PLL circuit becomes narrow in the transmission mode, a phase noise characteristic and a transmission spectrum characteristic at transmission satisfy a predetermined condition. Using the fractional type PLL circuit makes it possible to reduce phase noise and broaden the loop band as compared with the use of an integer type PLL circuit. Correspondingly, the time required to allow variations in the frequency of the PLL circuit produced due to variations in power supply voltage with gain switching of each PGA at reception to converge is shortened.

Advantageous effects obtained by a representative one of the inventions disclosed in the present application will briefly be explained as follows:

According to the present invention, a semiconductor integrated circuit (RF IC) for communication, which enables variations in the frequency of a PLL circuit to converge within a predetermined time even though the switching of gain of each PGA is performed in mid course of reception and enables a phase noise characteristic and a transmission spectrum characteristic at transmission to satisfy a predetermined condition.

DETAILED DESCRIPTION OF THE PREFERRED EMBODIMENTS

Preferred embodiments of the present invention will next be explained using the accompanying drawings.

Figure 1:
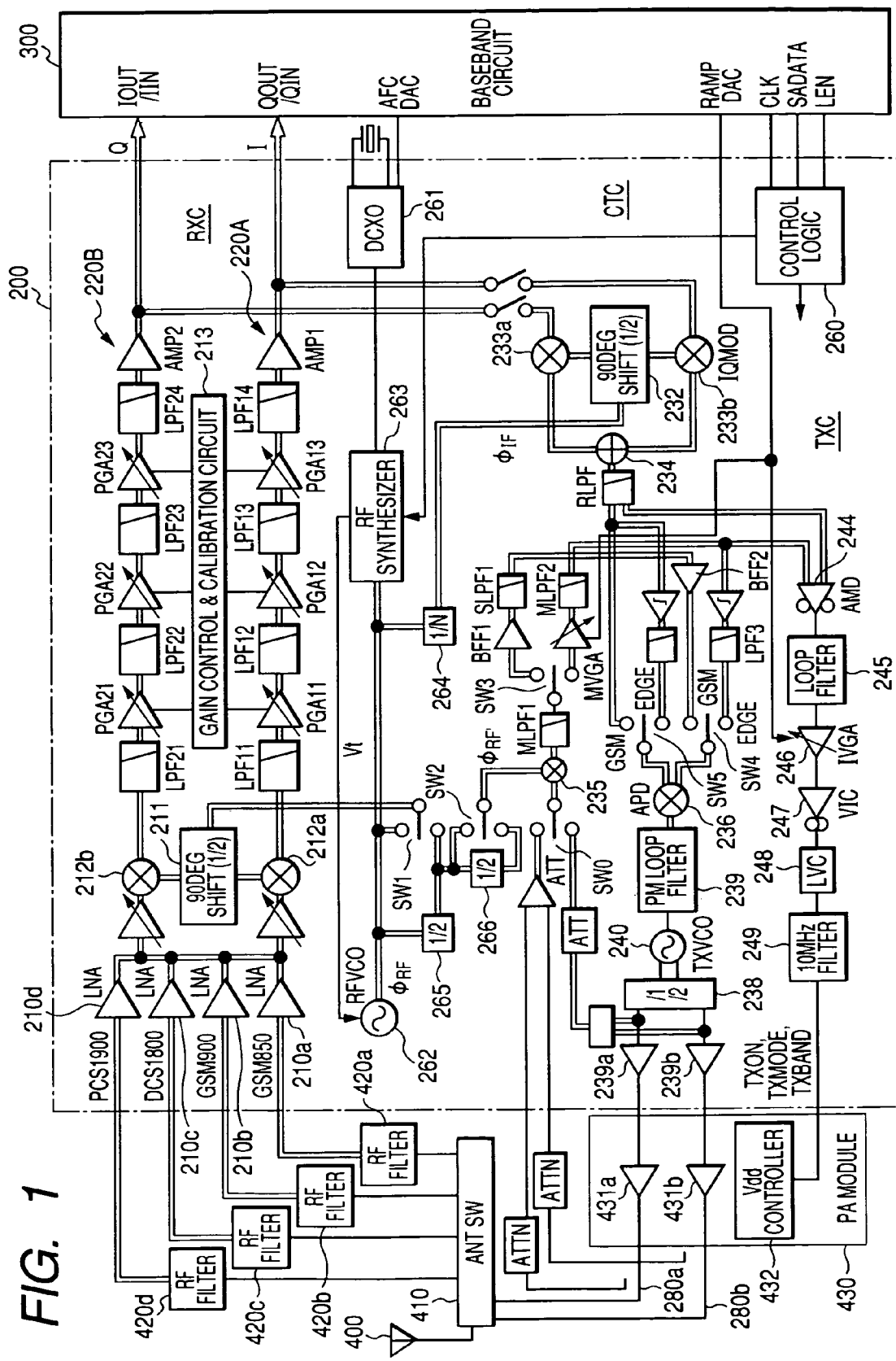
FIG. 1 is a block diagram showing one example illustrative of a multi-band type semiconductor integrated circuit for communication (RF IC), to which the present invention is applied, and a communication system using the same.

FIG. 1 shows one example illustrative of a multi-band type semiconductor integrated circuit for communication (RF IC) to which the present invention is applied, and a wireless communication system using the same.

As shown in FIG. 1, the system comprises an antenna 400 for transmitting and receiving a signal wave, a transmission/reception selector switch 410, RF filters 420a through 420d comprising SAW filters or the like each of which eliminates an unnecessary wave from a received signal, a high frequency or RF power amplifier circuit (power module) 430 which amplifies a transmit signal, a high-frequency or RF IC 200 which demodulates the received signal and modulates the transmit signal, and a baseband circuit 300 which performs baseband processing such as conversion of an audio signal and a data signal to be transmitted to an I signal corresponding to a component in phase with a basic wave and a Q signal corresponding to a quadrature component, conversion of the demodulated receive I and Q signals into an audio signal or a data signal, etc. and which transmits signals for controlling the RF IC 200, etc. The RF IC 200 and the baseband circuit 300 are respectively configured on discrete semiconductor chips as semiconductor integrated circuits.

If divided broadly, then the RF IC 200 comprises a reception-system circuit RXC, a transmission-system circuit TXC and a control-system circuit CTC comprising circuits common to a transmit-receive system, such as a control circuit, a clock generator, etc. other than the RXC and TXC. An RF-PLL circuit (RFVCO 262 and RF synthesizer 263) indented for the present invention is configured as a fractional PLL capable of setting a division ratio of a decimal point. The RF-PLL circuit is provided as a common carrier wave generator which generates a carrier wave signal used in frequency conversion and modem in each of the reception-system circuit RXC and the transmission-system circuit TXC.

The oscillation frequency of the RFVCO 262 of the RF-PLL circuit is set to values different in a reception mode and a transmission mode. In the reception mode, the oscillation frequency fRF of the RFVCO 262 is set to, for example, 3476 to 3576 MHz in the case of GSM850, 3700 to 3840 MHz in the case of GSM900, 3610 to 3730 MHz in the case of DCS and 3860 to 3980 MHz in the case of PCS. This is divided into ½ by a corresponding frequency divider 265 in the case of GSM. This is supplied to a frequency dividing and phase shifting circuit 211 as it is in the case of DCS and PCS, where division and phase shifting are made thereto, followed by being supplied to mixers 212a and 212b as quadrature signals.

The RFVCO 262 is constituted of an LC resonant oscillator or the like. The RFVCO 262 is configured in such a manner that a plurality of capacitive elements constituting LC resonant circuits are arranged in parallel through switch elements respectively, and the switch elements are selectively turned on by band switch signals to select the value of each connected capacitive element, i.e., C of each LC resonant circuit, thereby making it possible to select the oscillation frequency stepwise. In the RFVCO 262, the capacitance value of the variable capacitive element changes in accordance with a control voltage Vt outputted from a loop filter lying in the RF synthesizer 263 so that the oscillation frequency changes continuously.

The detailed description of the RF IC 200 will be made later. The RF-PLL circuit constituted of the fractional PLL will first be explained using FIG. 2.

The PLL circuit according to the present embodiment includes a variable divider 631 which divides an oscillation signal φRF of the RFVCO 262 into 1/N, a phase detector or comparator 632 which detects the difference in phase between a reference oscillation signal φref generated by a reference oscillator (DCXO) 261 which generates a reference oscillation signal φref like 26 MHz, and a signal φdiv divided by the variable divider 631, a charge pump 633 which generates and outputs a current Icp corresponding to the detected difference in phase, and a loop filter 634 which generates a voltage corresponding to the detected phase difference outputted from the charge pump 633. In the PLL circuit, the voltage smoothed by the loop filter 634 is fed back to the RFVCO 262 as an oscillation control voltage Vt, where it oscillates at a frequency corresponding to Vt. The variable divider 631 can be constituted of a counter.

Also the PLL circuit according to the present embodiment is provided with a selector switch 635 which applies a predetermined voltage VDC to the RFVCO 262 in a state in which a loop is being opened before the start of oscillation, a fixed frequency divider 636 which frequency-divides the reference oscillation signal φref at a predetermined division ratio, and an autoband selector 637 which has a determination circuit for determining leads or delays in the phases of the signal φr' divided by the variable divider 631 and the signal φdiv divided by the variable divider 631 and which determines a used frequency band from the leads or delays in phase. The autoband selector 637 is a circuit having the function of setting the frequency of a carrier wave immediately before transmission and reception according to a channel to be used. Since the function is not directly related to the present invention, its detailed description is omitted.

In order to set a division ratio of the variable divider 631, the PLL circuit according to the present embodiment is provided with a division ratio generator (division ratio setting logic) 267 which calculates and sets the division ratio of the variable divider 631 from channel information CH indicative of a setting frequency supplied from outside, band information BND indicating whether the band to be used is GSM850, GSM900, DCS or PCS, mode information T/R indicative of transmission or reception, and division ratio setting information NIF set to an IF divider 264. The division ratio generator 267 comprises a division ratio calculator 671, a sigma delta modulator 672 which inputs fractional data therein, and an adder 673. The channel information CH is inputted from the baseband circuit 300 as a value obtained by dividing a transmit frequency or a receive frequency by 100 kHz. As an alternative to the supply of the division ratio NIF of the IF divider 264 from the baseband circuit 300, the division ratio NIF may automatically be determined inside a chip (by a controller 260, for example) on the basis of the information T/R indicative of either transmission or reception, the band information BND and the channel information CH and set to the IF divider 264.

The principle of operation of the fractional PLL will next be explained. The phase comparator 632 detects the difference in phase between the reference clock φref corresponding to its input signal and the feedback signal φdiv outputted from the variable divider 631 and outputs a signal corresponding to the phase difference. The charge pump 633 supplies a current to the loop filter 634 according to the detected phase difference. The corresponding loop filter 634 converts the current outputted from the charge pump 633 to a DC voltage and controls the oscillation frequency of the RFVCO 262. The circuit is operated in such a manner that the phases coincide with each other.

Thus, assuming that the frequency of the reference oscillator (DCXO) 261 is fREF, the division ratio of the variable divider 631 is N, and the output frequency of the variable divider 631 is fDIV, an output frequency fvco becomes fvco=fDIV*N=fREF*N. On the other hand, the division ratio generator 267 calculates an integral part I of a division ratio and a fractional part F/G thereof from the channel information CH sent from the baseband IC. I, F and G are respectively defined here as 140, 28 and 1300 by way of example. The fractional part is modulated in a time-base direction, based on a determined denominator G (G=1300 here) by the sigma delta modulator 672. In the present embodiment, the sigma delta modulator 672 outputs "+1" by 28 times of 1300 times of the reference clock φref and outputs "0" with respect to the remaining 1272 times.

Calculating the average of 1300 times as to the reference clock yields the division ratio N=140+28/1300= 140.0215 . . . . This results in a division ratio containing a decimal number. Thus, since the division ratio contains not only the integer but also the decimal number, the output frequency of the fractional PLL can be switched at a frequency smaller than the frequency fREF of the reference clock φref. On the other hand, a division ratio N of an integer PLL is always a fixed value (integer). Thus, the output frequency fvco can be changed only at the same frequency as the frequency fREF of the reference clock φref. An example illustrative of a division ratio comparison between the fractional PLL and the integer PLL is shown in Table 1. When the two PLLs are equal in the output frequency and the channel interval, they are respectively different in the frequency fREF of the reference clock φref and the division ratio N. It is understood that the division ratio of the fractional PLL can be reduced by two digits or so as compared with the division ratio of the integer PLL.

TABLE 1

| PLL type | output frequency | channel interval | reference frequency | division ratio N |
|---|---|---|---|---|
| fractional | 4.0 GHz | 400 KHz | 26 MHz | 153.8 |
| integer | 4.0 GHz | 400 KHz | 400 KHz | 10000 |

Figure 3A:
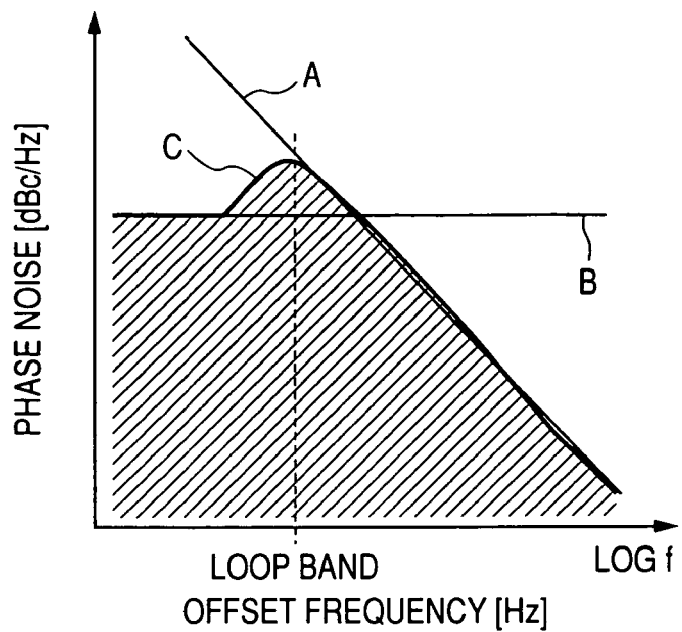
FIG. 3(A) is a characteristic diagram showing PLL output phase noise where a loop band is narrow.
Figure 3B:
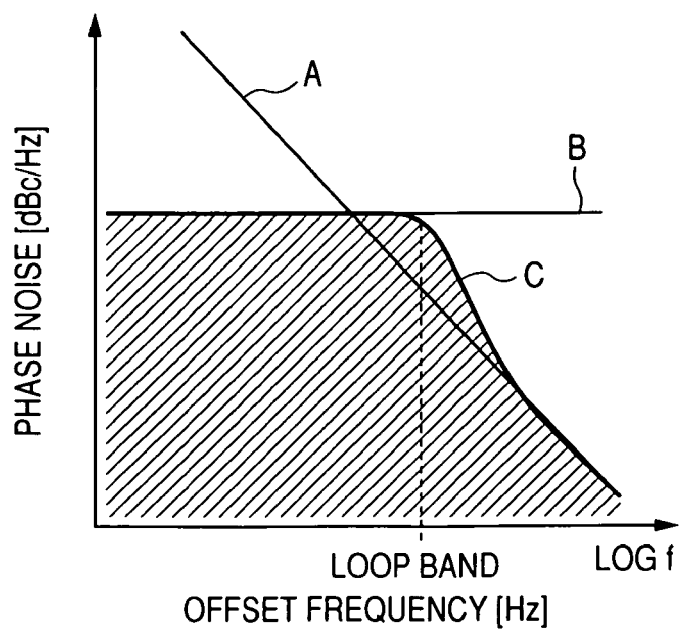
FIG. 3(B) is a characteristic diagram showing PLL output phase noise where a loop band is wide.

A relationship among a division ratio of the variable divider 631 of each PLL, a loop band and a phase error will next be explained. FIG. 3(A) shows PLL output phase noise where the loop band is narrow, and FIG. 3(B) shows PLL output phase noise where the loop band is wide. A phase noise characteristic A of a single VCO, a phase noise characteristic B of a PLL's constituent element (synthesizer) other than the VCO, and a phase noise characteristic C of a PLL output, which is obtained by combining the two together, are shown in each figure.

The phase noise characteristic of the PLL output complies with the phase noise characteristic of the PLL's constituent element other than the VCO in a region in which an offset frequency is less than or equal to the loop band, whereas the phase noise characteristic thereof complies with the phase noise characteristic of the single VCO in a region in which the offset frequency is greater than or equal to the loop band. In order to reduce the phase noise of the PLL output, the area of each region shown hatched in FIG. 3 may preferably be minimized. To this end, it is desirable to set the frequency at a position where the phase noise characteristic A of the single VCO and the phase noise characteristic B of the PLL's constituent element intersect, to a loop band.

Figure 4A:
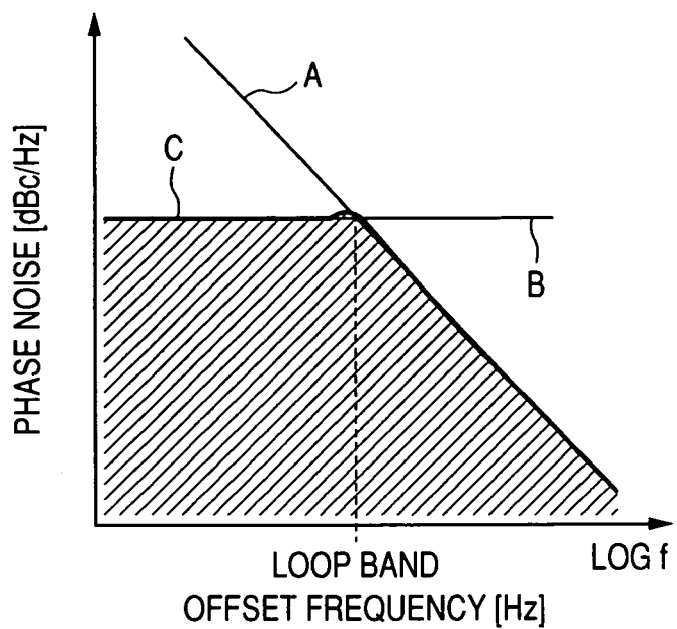
FIG. 4(A) is a characteristic diagram illustrating phase noise of an integer PLL.
Figure 4B:
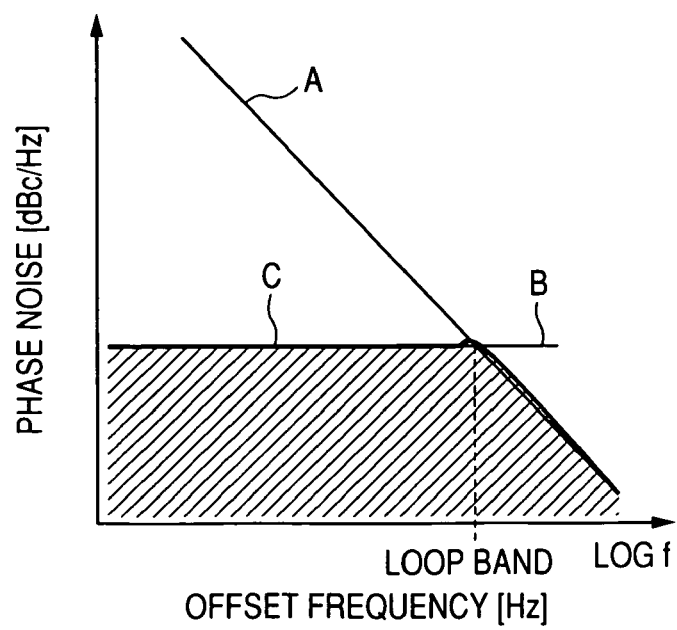
FIG. 4(B) is a characteristic diagram illustrating phase noise of a fractional PLL.

On the other hand, the phase noise of the PLL's constituent element other than the VCO is reduced as the division ratio N becomes low. FIG. 4(A) shows phase noise of the integer PLL, and FIG. 4(B) shows phase noise of the fractional PLL, respectively. When FIG. 4(A) and FIG. 4(B) are compared with each other, the phase noise of the PLL's constituent element other than the VCO is small in the fractional PLL. This is because the fractional PLL is lower than the integer PLL in the division ratio N. It is thus understood that the fractional PLL can be made wide in loop band. Therefore, a discussion will next be made of to which extent the loop band of the fractional PLL can be expanded.

Figure 5A:
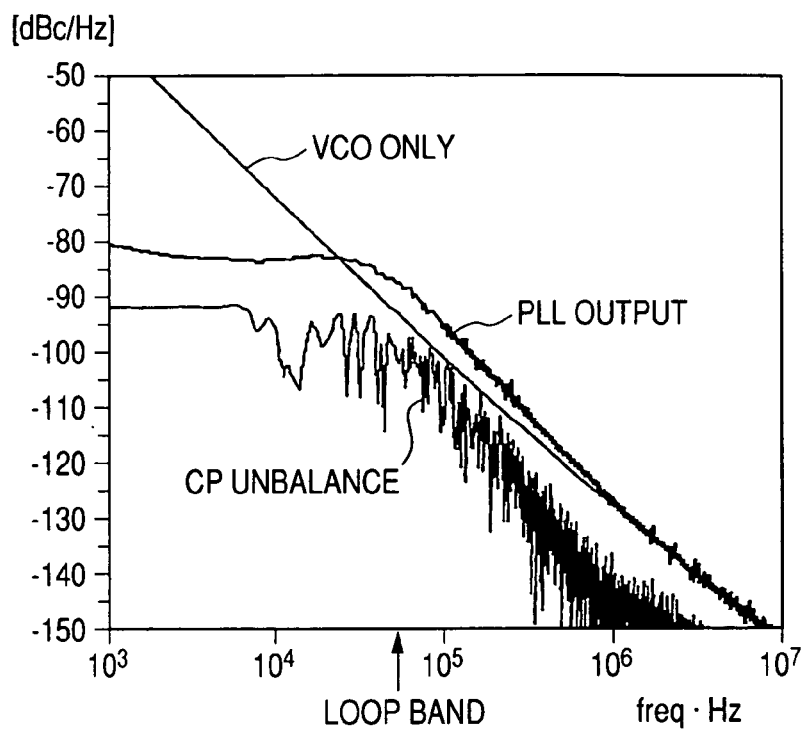
FIG. 5(A) is a characteristic diagram showing a phase noise characteristic where a loop band of the fractional PLL is 50 KHz.
Figure 5B:
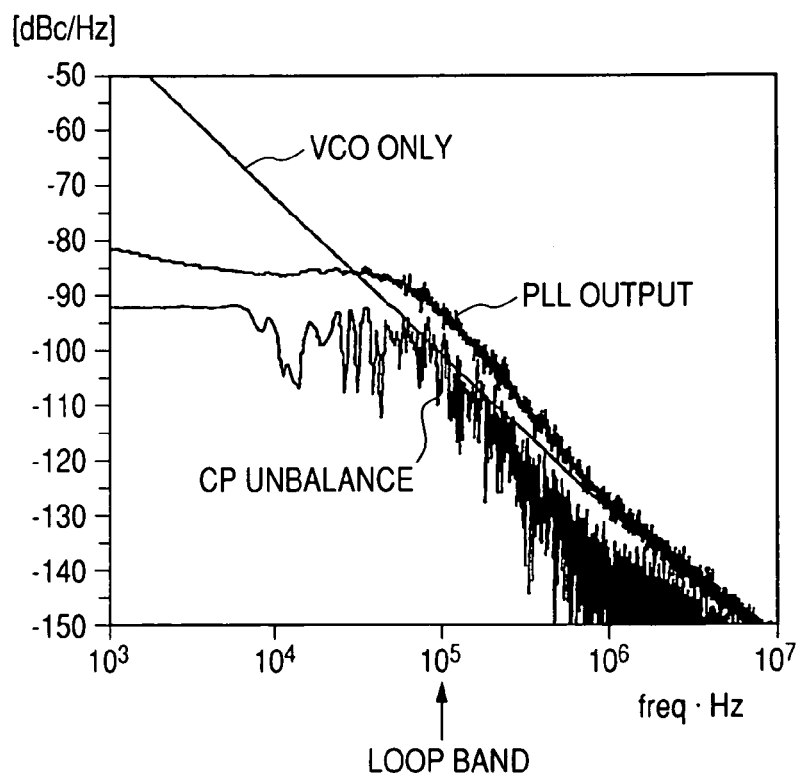
FIG. 5(B) is a characteristic diagram showing phase noise where the loop band thereof is 100 KHz.

FIGS. 5(A) and 5(B) respectively show phase noise characteristics where the loop band of the fractional PLL is 50 KHz and 100 KHz. When a sink current of the charge pump and a source current are unbalanced therebetween in the fractional PLL, a change in the frequency of the output of the variable divider, which is detected by a phase detector, is not transferred to the loop filter accurately and results in phase noise. This is because the division ratio of the variable divider frequently changes in the fractional PLL. It presents a problem or challenge peculiar to the fractional PLL. It is understood from FIGS. 5(A) and 5(B) that the phase noise depends on the loop band and the loop band of 50 KHz is good in phase noise as compared with the loop band of 100 KHz.

On the other hand, the phase noise is brought to a good condition by improving the characteristic of the charge pump or reducing the loop band. However, the charge pump generally makes use of a circuit in which a PMOS or PNP transistor is used on the source side at which each capacitive element of the loop filter is charged up and an NMOS or NPN transistor is used on the sink side at which each capacitive element of the loop filter is discharged. Since currents on the source and sink sides are apt to be unbalanced because the circuit is asymmetric, it is difficult to improve the characteristic of the charge pump.

It is understood that when FIGS. 5(A) and 5(B) are compared with each other, the phase noise produced due to the unbalance of the charge pump becomes large as the loop band becomes large. Thus, there is a limit to the loop band due to the unbalance of the charge pump in the case of the fractional PLL. Noise prior or subsequent to an offset frequency 400 KHz of a PLL output directly influences a modulation spectrum of 400 KHz at transmission. That is, it is not possible to sufficiently attenuate a signal level of a frequency away 0.4 MHz from the fraudulency of the carrier wave. Therefore, the loop band cannot be made large to some degree or more upon transmission. On the other hand, noise that presents a problem upon reception is an offset frequency of 1.6 MHz or higher, and noise lying in a frequency band prior or subsequent to 400 KHz is insignificant. Further, noise greater than or equal to 1.6 MHz at reception can be attenuated sufficiently at a subsequent-stage lowpass filter.

From the above result of discussions, the present embodiment is configured in such a manner that the fractional PLL is adopted as the RF-PLL circuit which generates the local oscillation signal φRF used as the carrier signal, and the frequency band of the loop filter is switchable. The loop band of the fractional PLL is set to the frequency like 40 KHz so as to meet the phase noise characteristic required in accordance with the GSM standard upon transmission, whereas upon reception, the loop band is made wide and set to a frequency ranging from 50 KHz to 60 KHz, whereby the time required to allow a variation in the frequency of the PLL due to a variation in power supply voltage with calibration of each PGA to converge is shortened.

Thus, since the loop band is made wide upon transmission, the modulation spectrum becomes satisfactory even though the phase noise becomes small. Since the loop band of the PLL is made narrow upon reception, it is possible to allow the PLL's frequency variation to converge within an allowable time even though the frequency variation occurs where such a receive slot that it is necessary to switch or select the gain of each PGA according to a change in reception level is continuous.

Reference will now be made to the relationship between the loop bands of the integer type PLL circuit and the fractional type PLL circuit and the time necessary for frequency switching.

Figure 6:
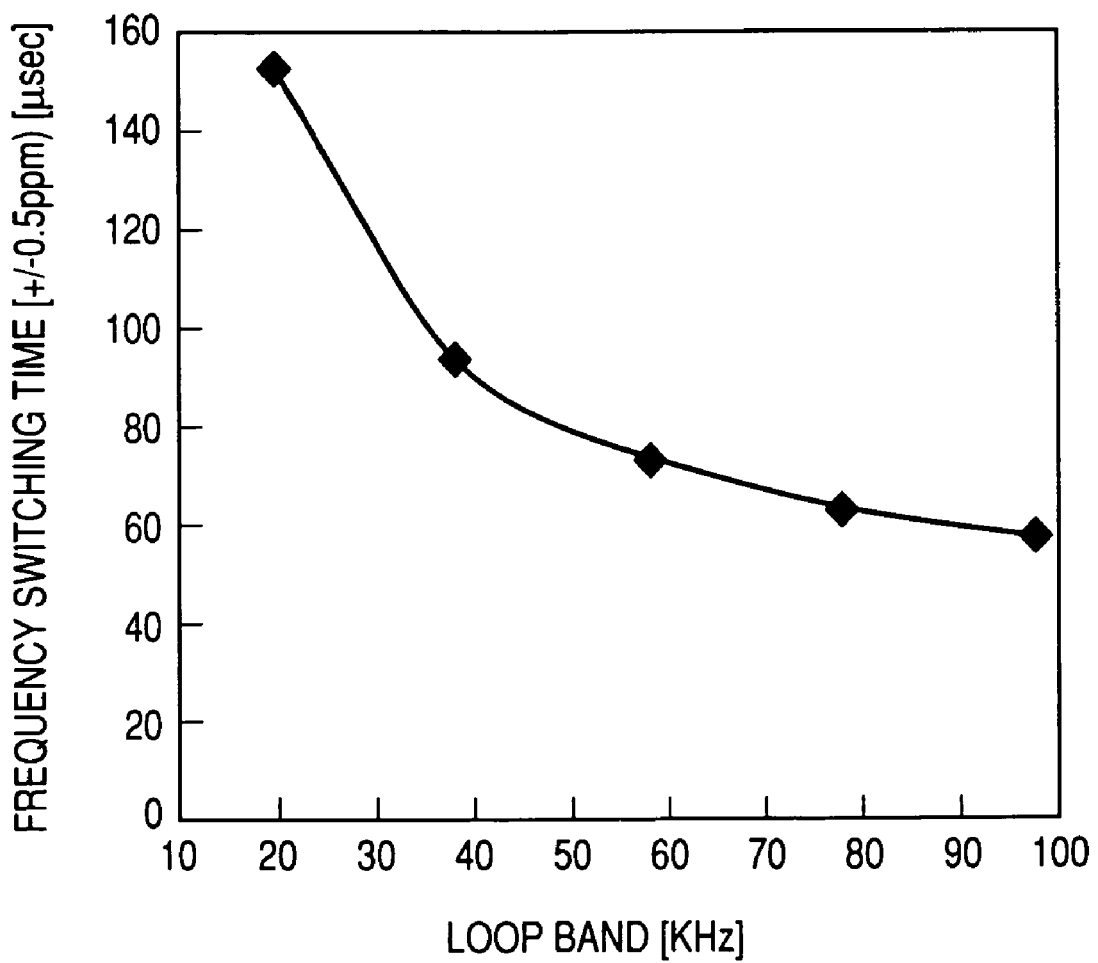
FIG. 6 is a graph showing the relationship between a frequency switching time and a loop band in a PLL circuit.

As described above, the time necessary for frequency switching in the PLL circuit becomes short as the loop band becomes wide. FIG. 6 shows the relationship between a frequency switching time and a loop band. It is understood from FIG. 6 that the effect of shortening the switching time becomes small as the loop band becomes wide to some extent. When the loop band changes from 20 KHz to 30 KHz, for example, the switching time is shortened by about 40 µs. When, however, the loop band is changed from 50 KHZ to 60 KHz, only the shortening of a stitching time of 10 µs or so can be expected.

The loop band of the general integer type PLL circuit used in the RF IC for the GSM is in the vicinity of 20 KHz. Accordingly, the invention described in the patent document 1 referred to above is effective for the integer type PLL circuit narrow in loop band. On the other hand, since the phase noise is small in a region low in frequency, in which the phase noise of the constituent element other than the VCO is dominant as described above, in the fractional PLL circuit, the loop band can be set so as to fall in the neighborhood of 50 to 60 KHz. It is understood from FIG. 6 that since the effect of shortening the switching time in such a region is smaller than the effect of shortening the switching time in the neighborhood of 20 KHz, the effect of reducing average current consumption per frame, that the present invention described in the patent document 1 has expected is almost unexpectable. Thus, the invention of the present application does not correspond to the invention which can easily be made from the invention described in the patent document 1.

Figure 7:
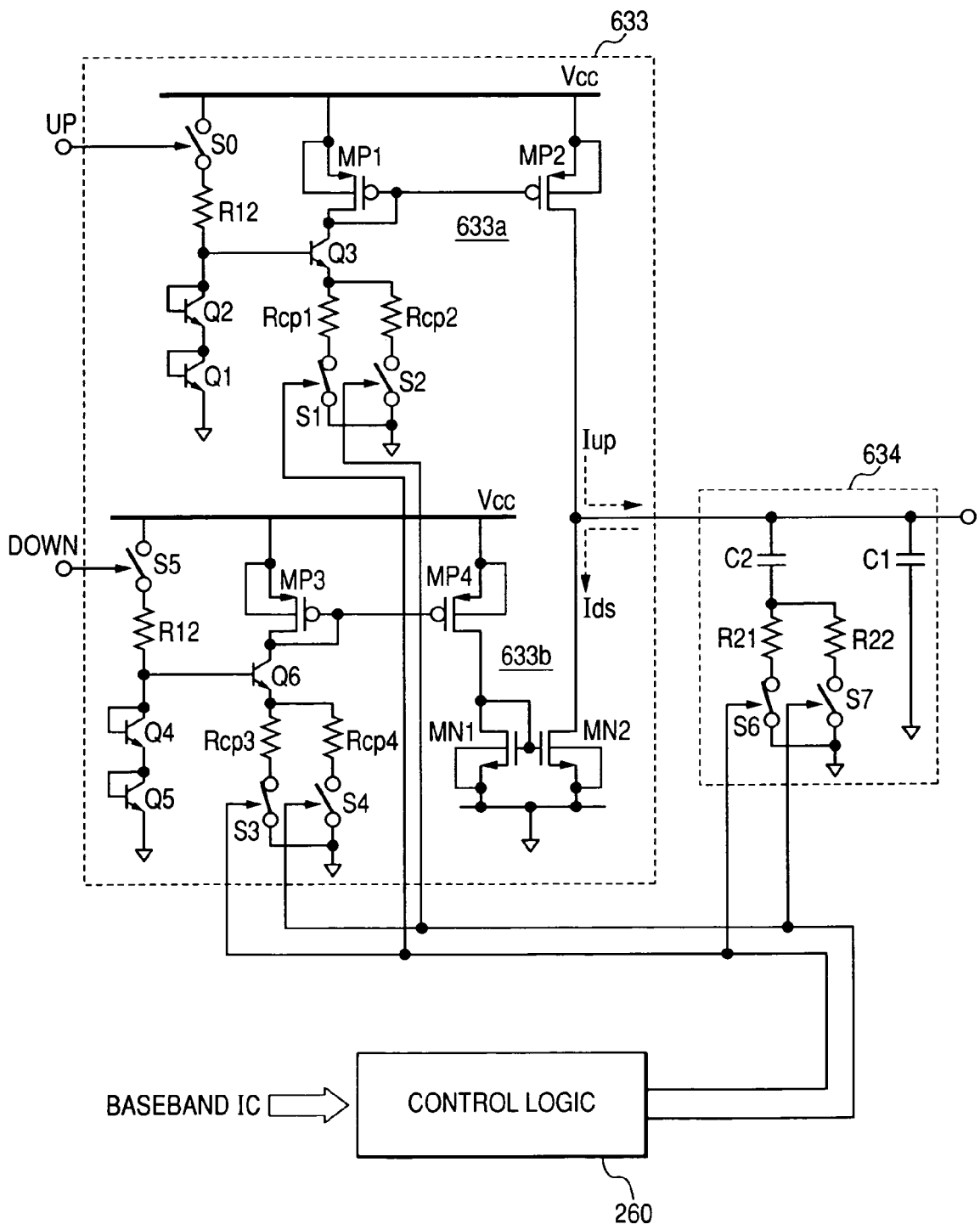
FIG. 7 is a circuit diagram showing an embodiment of a loop filter capable of switching a loop band.

An embodiment illustrative of a charge pump and a loop filter capable of performing loop-band switching will next be explained using FIG. 7. In FIG. 7, reference numeral 633a indicates a circuit which outputs a current Iup in response to an up signal UP supplied from its corresponding pre-stage phase comparator 632 and charges electrical charges into their corresponding capacitors C1 and C2 of a post-stage loop filter 634, and reference numeral 633b indicates a circuit which draws or extracts a current Ids in response to a down signal DOWN supplied from the corresponding pre-stage phase comparator 632 and discharges the electrical charges from the capacitors C1 and C2 of the post-stage loop filter 634.

As shown in FIG. 7, the circuit 633a on the charge side of the charge pump 633 is provided with a switch S0 on/off-controlled by the signal UP supplied from the pre-stage phase comparator 632 when a delay in phase occurs, and two resistors Rcp1 and Rcp2 and switches S1 and S2 respectively provided between the emitter of a transistor Q3 placed in series with a MOS transistor MP1 that constitutes a current mirror circuit, and a ground point. Similarly, the circuit 633b on the discharge side is provided with a switch S5 on/off-controlled by a signal DOWN supplied when a lead in phase takes place, and two resistors Rcp3 and Rcp4 and switches S3 and S4 respectively provided between the emitter of a transistor Q6 placed in series with a MOS transistor MP3 constituting a current mirror circuit, and the ground point. When the switch S0 is turned on, a current is caused to flow through the current mirror circuit (MP1, MP2) of the circuit 633a on the charge side. When the switch S5 is turned on, a current is caused to flow through the current mirror circuit (MP3, MP4; MN1, MN2) of the circuit 633b on the discharge side. With either the switch S1 or S2 and either the switch S3 or S4 being placed in an on state by control signals supplied from control logic 260 at this time, the currents that flow through the current mirror circuits increase or decrease, and correspondingly the charge current Iup and the discharge current Ids are increased or decreased.

The loop filter 634 makes use of two capacitors C1 and C2 and a primary lag-lead filter in which resistors are connected in series with C2 of the two capacitors, and is provided with the two resistors R21 and R22 and switches S6 and S7 connected in series with C2. When either one of the switches S6 and S7 is brought to an on state by its corresponding control signal supplied from the control logic 260, the cutoff frequency of the loop filter 634 is increased or decreased in synchronization with the switching of the currents at the charge pump 633. Described specifically, the values of the respective resistors of the loop filter 634 are set in such a manner that when the current Icp (Iup, Ids) of the charge pump 633 is increased, the resistance value of the loop filter 634 is reduced, whereas when the current is decreased, the resistance value thereof is raised.

Thus, the present embodiment is configured in such a manner that the loop band can be switched with the switching between the currents of the charge pump 633, and the resistors constituting the loop filter 634 can also be switched according to the switching between the currents. This is because when the current of the charge pump is switched or selected and the resistance value of the loop filter is changed, the phase of a feedback signal is turned or shifted, and when its phase is turned or shifted 180° or more from the phase of a reference signal, the loop becomes instable. A relationship between the loop band and the turning of the loop's phase will be explained below.

Figure 2:
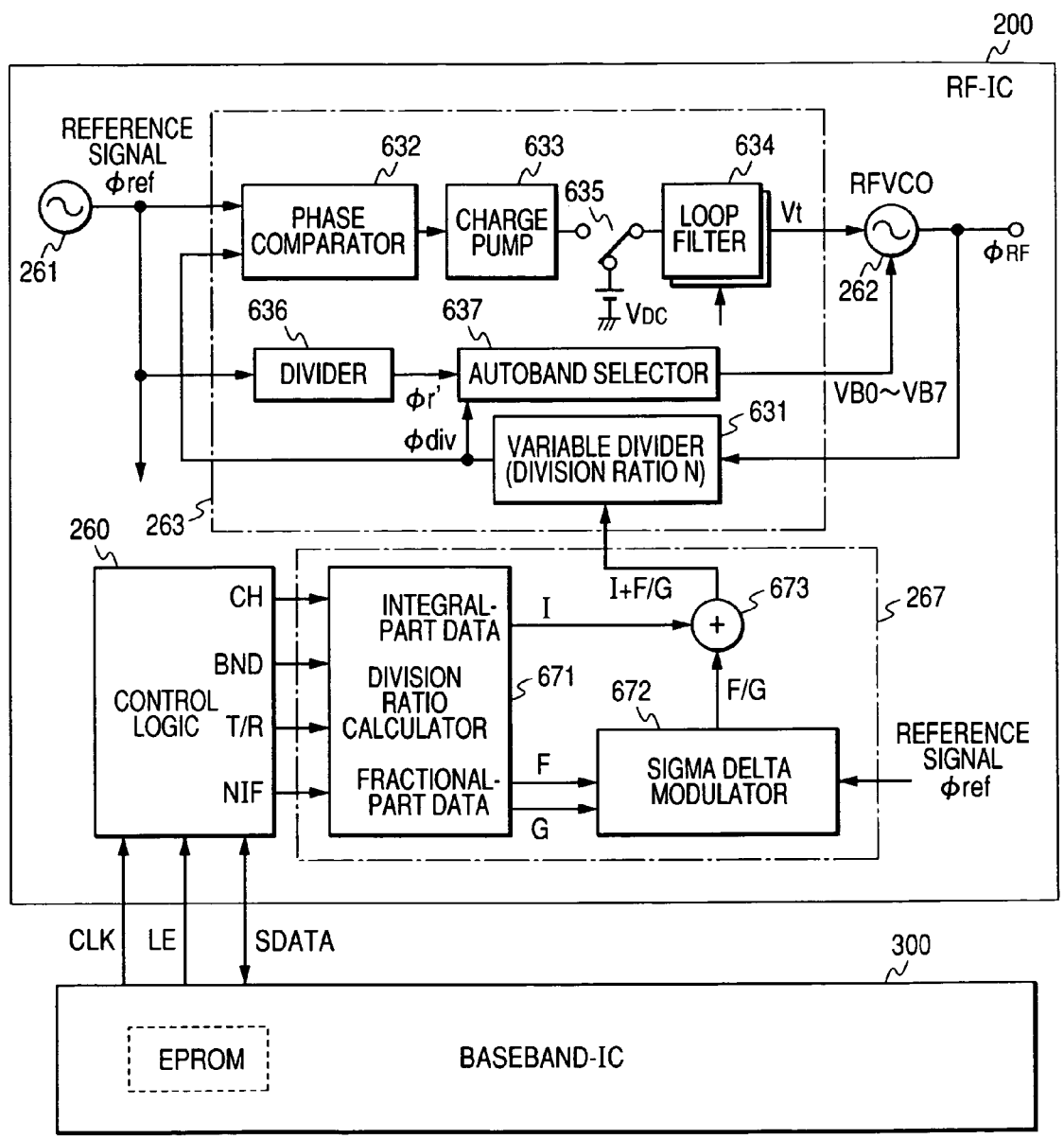
FIG. 2 is a block diagram showing a configurational example illustrative of both an RF-PLL synthesizer comprising a fractional PLL in an RF IC according to an embodiment, and division ratio setting logic.

Let's consider where in the RF-PLL shown in FIG. 2, the output of the variable divider 631 is cut off and the loop is made open. The phase ΦDIV of the output φdiv of the variable divider 631 with respect to the phase ΦREF of the reference signal φref is defined as an open loop transfer function G (=ΦDIV/ΦREF). When the lag-lead filter is used as the loop filter 634 as described above, the open loop transfer function G(f) of the RF-PLL is given by the following equation:

$$G(f) = \frac{I_{CP} * K_{VCO}}{(C_1 + C_2) * N} * \frac{1 + \frac{jf}{f_1}}{(j2\pi f)^2 * \left(1 + \frac{jf}{f_2}\right)} \quad (1)$$

f1 and f2 are expressed as follows:

$$f1 = (\tfrac{1}{2}\pi) \times 1/(C2 \cdot R2)$$

$$f2 = (\tfrac{1}{2}\pi) \times (C1+C2)/(C1 \cdot C2 \cdot R2) \approx (\tfrac{1}{2}\pi) \times 1/(C1 \cdot R2) \quad (2)$$

Figure 8:
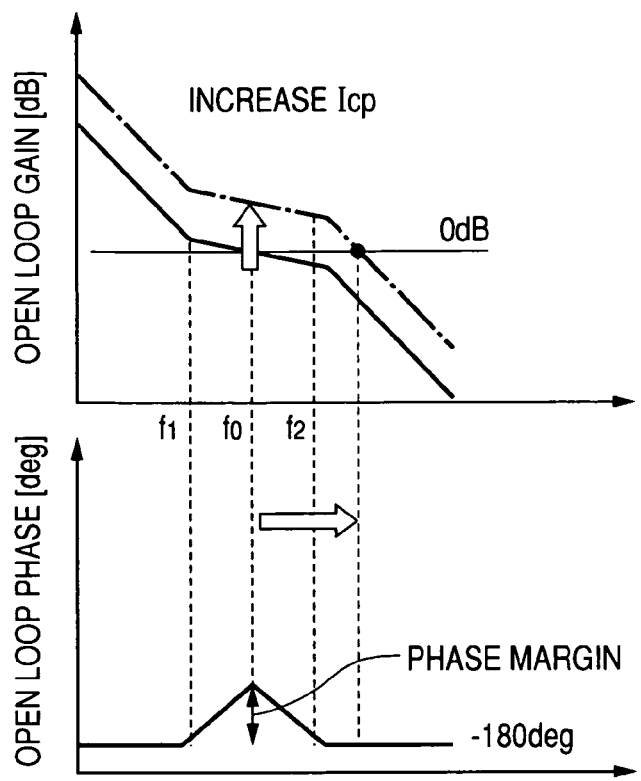
FIG. 8 is a characteristic diagram illustrating a frequency response characteristic of an open loop transfer function of the RF-PLL according to the embodiment.

In the equation (1), $I_{CP}$ indicates a current [A] of the charge pump, $K_{VCO}$ indicates a conversion coefficient [Hz/V] of the VCO, and N indicates a division ratio of the variable divider 631. FIG. 8 shows the frequency response characteristics of the open loop transfer function. A frequency f0 at which gain reaches 0 dB, is a loop band. The gain decreases at a slope of −40 dB/dec in a low region. The gain decreases at a slope of −20 dB/dec from a frequency f1 and decreases at a slope of −40 dB/dec again from a frequency f2. The frequencies f1 and f2 are determined depending on a constant of the loop filter. On the other hand, the phase is constant at −180 deg in the low region. The phase is brought back from the vicinity of the frequency f1 and reaches the peak at the frequency f0. Thereafter, the phase is brought back to −180 deg in the vicinity of the frequency f2. A difference between the phase of the loop band f0 and −180 deg is referred to as a phase margin. As the phase margin becomes small, the feedback loop becomes instable.

Figure 9:
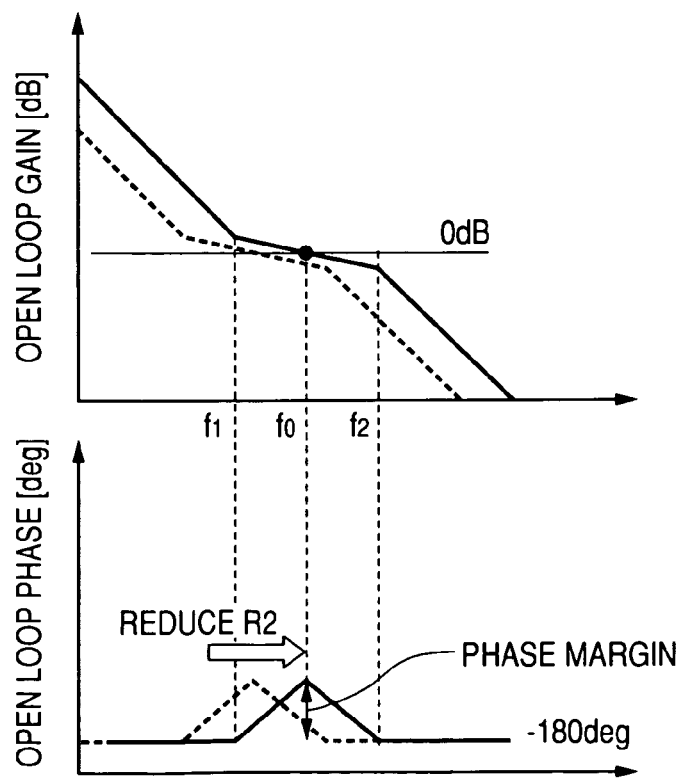
FIG. 9 is a characteristic diagram showing a frequency response characteristic of an open loop transfer function where a current of a charge pump and the resistance of the loop filter are switched.

It is understood from the equation (1) that the current Icp of the charge pump may be increased to make the loop band wide. A frequency response characteristic of the open loop transfer function at the time that the current Icp of the charge pump is increased, is indicated by a dashed line in FIG. 8. It is understood from the figure that although the loop band f0 becomes high, the phase margin becomes small. In order to ensure the phase margin, f1 and f2 may be made high. This is equivalent to the fact that R2 is reduced as is understood from the equation (2). A frequency response characteristic of the open loop transfer function at the time that the current Icp of the charge pump is increased and the resistor R2 of the loop filter is reduced, is indicated by a solid line in FIG. 9. It is understood from FIG. 9 that the loop band f0 can be made high while the phase margin remains ensured. When it is desired to lower the loop band f0 while the phase margin is being ensured, the resistor R2 of the loop filter may be increased in reverse.

Simultaneously adjusting the current Icp of the charge pump and the resistor R2 of the loop filter in this way makes it possible to change the loop band while the phase margin is being ensured. If the circuit shown in FIG. 7 is used, then the loop band can be changed while the phase margin is being ensured.

More detailed descriptions of the RF IC 200 shown in FIG. 1 will finally be made. Although not restricted in particular, the RF IC 200 according to the present embodiment is configured so as to be capable of modulating and demodulating signals lying in four frequency bands according to three communication systems of GSM850 and GSM900, DCS1800 and PCS1900.

Correspondingly, the filters 420a and 420b which cause receive signals lying in the frequency band of a GSM system to pass therethrough, the filter 420c which causes receive signals lying in the frequency band of DCS1800 to pass therethrough, and the filter 420d which causes receive signals lying in the frequency band of PCS1900 to pass therethrough are provided on the receiving side.

The reception-system circuit RXC employed in the present embodiment comprises low-noise amplifiers 210a through 210d which respectively amplify the receive signals lying in the respective frequency bands of PCS, DCS and GSM, a division and phase shift circuit 211 which divides a local oscillation signal φRF generated by a high-frequency or RF oscillator (RFVCO) 261 to be described later to thereby generate quadrature signals 90° out of phase with one another, mixers 212a and 212b which mix the receive signals amplified by the low-noise amplifiers 210a, 210b, 210c and 210d with the quadrature signals generated by the division and phase shift circuit 211 to thereby perform demodulation and down-conversion thereof, high-gain amplifying sections 220A and 220B which respectively amplify the demodulated I and Q signals and output them to the baseband circuit 300, a gain control & calibration circuit 213 for controlling gain of amplifiers in the high-gain amplifying sections 220A and 220B and canceling input DC offsets thereof, etc. The reception-system circuit RXC employed in the present embodiment adopts a direct down conversion system which directly down-converts the receive signals into signals lying in a frequency band of the baseband.

The high-gain amplifying section 220A has a configuration in which a plurality of low-pass filters LPF11, LPF12, LPF13 and LPF14 and gain control amplifiers PGA11, PGA12 and PGA13 are alternately connected in series form and an amplifier AMP1 is connected to the final stage. The high-gain amplifying section 220A amplifies the demodulated I signal and outputs it to the baseband circuit 300. In a manner similar to above, the high-gain amplifying section 220B also has a configuration in which a plurality of low-pass filters LPF21, LPF22, LPF23 and LPF24 and gain control amplifiers PGA21, PGA22 and PGA23 are alternately connected in series form and an amplifier AMP2 is connected to the final stage. The high-gain amplifying section 220B amplifies the demodulated Q signal and outputs it to the baseband circuit 300.

The gain control & calibration circuit 213 comprises AD converters (ADC) which are provided corresponding to the gain control amplifiers PGA11 through PGA13 and PGA21 through PGA23 and convert differences in potential among the outputs of the gain control amplifiers PGA11 through PGA23 in a state in which input terminals are short-circuits thereamong, into digital signals, DA converters (DAC) which generate such input offset voltages as to bring DC offsets of the outputs of the corresponding gain control amplifiers PAG11 through PGA13 and PGA21 through PAG23 to "0" on the basis of the results of conversion by these AD converters and give them to differential inputs, a control circuit which controls these AD converters (ADC) and DA converters (DAC) to cause them to perform calibration operations, etc.

The control-system circuit CTC includes a control circuit (control logic) 260 which controls the whole chip, a reference oscillator (DCXO) 261 which generates an oscillation signal φref used as the reference, a high frequency or RF oscillator (RFVCO) 262 used as a local oscillator which generates a high frequency oscillation signal φRF for frequency conversion, an RF synthesizer 263 which constitutes a PLL circuit together with the RF oscillator (RFVCO) 262, a frequency divider 264 which generates a signal φIF of an intermediate frequency necessary for modulation of a transmit signal and upconversion of a first stage, frequency dividers 265 and 266 which respectively divide the oscillation signal φRF to generate signals necessary for frequency conversion of a feedback signal of a PLL circuit for transmission, mode selector switches SW1 and SW2, etc.

Each of the switches SW1 and SW2 switches connecting states in a GSM mode for performing transmission/reception in accordance with the GSM system and a DCS/PSC mode for performing transmission/reception in accordance with the DCS or PCS system and selects a division ratio for a signal to be transferred. These switches SW1 and SW2 are respectively controlled by signals supplied from the control circuit 260. Since the reference oscillation signal φref needs to have high frequency accuracy, an external crystal oscillator is connected to the reference oscillator 261. A frequency like 26 MHz or 13 MHz is selected as the reference oscillation signal φref. A crystal oscillator for such a frequency is a general-purpose part and easily available.

The control circuit 260 is supplied with a synchronizing clock signal CLK, a data signal SDATA, and a load enable signal LEN used as control signal from the baseband circuit 300. When the load enable signal LEN is asserted to an effective level, the control circuit 260 sequentially takes or fetches therein the data signal SDATA transferred from the baseband circuit 300 in sync with the clock signal CLK and generates control signals for the inside of the chip in accordance with commands contained in the data signal SDATA. Although not restricted in particular, the data signal SDATA is transferred serially.

The transmission-system circuit TXC comprises a division and phase shift circuit 232 which further divides an intermediate frequency signal φIF like, for example, 160 MHz generated by dividing the oscillation frequency φRF supplied from the RFVCO 262 by the IF divider 264 into two and generates quadrature signals 90° out of phase with each other, modulators 233a and 233b which modulate the generated quadrature signals by I and Q signals supplied from the baseband circuit 300, an adder 234 which combines the modulated signals, a transmitting oscillator (TXVCO) 240 which generates a transmit signal φTX having a predetermined frequency, an offset mixer 235 which mixes a feedback signal obtained by extracting the transmit signal φTX outputted from the transmitting oscillator (TXVCO) 240 by couplers 280a and 280b or the like and attenuating it with an attenuator ATT, and a signal φRF' obtained by dividing the high frequency oscillation signal φRF generated by the RF oscillator (RFVCO) 262 to thereby generate a signal having a frequency corresponding to the difference in frequency therebetween, a phase comparator 236 which compares the output of the offset mixer 235 and the signal TXIF combined by the adder 234 to thereby detect the difference in phase therebetween, a loop filter 237 which generates a voltage corresponding to the output of the phase comparator 236, a divider 238 which divides the output of the transmitting oscillator (TXVCO) 240 and uses it as a transmit signal for GSM, transmission output buffers 239a and 239b, etc.

The transmission-system circuit according to the present embodiment adopts an offset PLL system which quadrature-modulates the transmit I and Q signals by the carrier wave of the intermediate frequency and mixes the feedback signal supplied from the output side of the TXVCO 240 and the signal φRF' obtained by dividing the high-frequency oscillation signal φRF of the RFVCO 262 to thereby perform down conversion into the signal of the intermediate frequency equivalent to the frequency difference (offset), and thereafter phase-compares the signal and the quadrature-modulated signal and controls the TXVCO 240 according to the different in phase therebetween. The PLL circuit for transmission (TX-PLL) which performs frequency conversion (upconvert), is constituted of the phase detector 236, loop filter 239, TXVCO 240 and offset mixer 235. A switch SW0 is provided in such a manner that as an alternative to the signals extracted by the couplers 280a and 280b, signals that branch out from a stage subsequent to the divider 238 are fed back to the mixer 235 to make it also possible to operate the PLL circuit.

In the multiband type wireless communication system according to the present embodiment, the control circuit 260 changes the frequency φRF of the oscillation signal of the RF oscillator 261 according to a band and a channel to be used, in accordance with, for example, a command issued from the baseband circuit 300 upon transmission/reception. Further, the control circuit 260 selects the switches SW1 and SW2 according to either the GSM mode or the DCS/PSC mode. With their switching, the frequency of the oscillation signal supplied to each of the reception-system circuit RXC and transmission-system circuit TXC is changed to perform switching between the frequencies for transmission/reception. Further, the control signals for changing over the selector switches SW1 and SW2 according to frequency bands for transmission/reception are supplied from the control circuit 260 to the switches SW1 and SW2. In the present embodiment, the division ratio NIF of the IF divider 264 is set by the corresponding control signal supplied from the control circuit 260.

In the transmission mode, the oscillation frequency fRF of the RFVCO 262 is set to, for example, 3571.33 to 3678.13 MHz in the case of GSM850, 3814.2 to 3964.13 MHz in the case of GSM900, 3557.21 to 3712.38 MHz in the case of DCS and 3848.41 to 3972.38 MHz in the case of PCS. This is divided into ¼ by the corresponding dividers 265 and 266 in the case of GSM and divided into ½ in the case of DCS and PCS, which in turn is supplied to the offset mixer 235 as φRF' through the switches SW1 and SW2.

The offset mixer 235 generates a differential signal equivalent to a difference (fRF'−FTX) in frequency between the φRF' and a feedback signal φTX outputted from the power amplifier circuit 430 or TXVCO 240 and supplies it to the phase comparator 236 through a lowpass filter MLPF1 or the like, whereby the transmitting PLL (TX-PLL) is operated in such a manner that the frequency of the differential signal coincides with the frequency of a modulation signal (the output of the modulator). In other words, the TXVCO 240 is controlled so as to oscillate at a frequency equivalent to the difference between the frequency (fRF/4 or fRF/2) of the oscillation signal φRF' outputted from the RFVCO 262 and the frequency (fTX) of the modulation signal. The output of the offset mixer 235 is supplied to the phase comparator 236 through paths different in the GSM mode for GMSK modulation and an EDGE mode for 8PSK modulation.

Switches SW3 and SW4 are provided to perform switching between the paths. A buffer BFF1, a lowpass filter SLPF1 and a buffer BFF2 are provided for a signal path in the GSM mode. A variable gain amplifier MVGA, a lowpass filter MLPF2, a limiter LIM2 and a lowpass filter LPF3 are provided for a signal path in the EDGE mode. A switch SW5 is provided which switches paths for supplying the transmit signal of the intermediate frequency, which is quadrature-modulated by the mixers 233a and 233b and combined by the adder 234 to the phase comparator 236, according to the supply of the output of the offset mixer 235 to the phase comparator 236 through the paths different in the GSM mode for GMSK modulation and the EDGE mode for 8PSK modulation. In the EDGE mode, the transmit signal is supplied to the phase comparator 236 through a limiter LIM1 and a lowpass filter LPF4.

Further, in the transmission-system circuit TXC according to the present embodiment, an amplitude control loop comprising an amplitude comparator 244 for comparing the output of the offset mixer 235 and the transmit signal quadrature-modulated by the mixers 233a and 233b and combined by the adder 234 and thereby detecting a difference in amplitude, a loop filter 245 for band-limiting the output of the amplitude comparator 244, a variable gain amplifier (IVGA) 246 for amplifying the band-limited signal, a voltage-current converter 247 for converting the amplified voltage of the amplitude control loop to a current, a level converter 248, a filter 249 for converting a current to a voltage, etc. is provided for the purpose of amplitude control in the EDGE mode. The transmission-system circuit TXC is configured such that amplitude modulation can be carried out in parallel with phase modulation.

When the GSM mode is selected, the amplitude comparator 244, the variable gain amplifier 246, the voltage-current converter 247 and the level converter 248 on a forward path of the amplitude control loop are respectively brought to a non-operating state. When the EDGE mode is selected, the variable gain amplifiers MVGA and IVGA are set in such a manner that the gain of the variable gain amplifier IVGA is reduced complementarily according to an output level indication signal Vramp outputted from the baseband circuit 300, i.e., when the gain of the variable gain amplifier MVGA is raised, whereas when the gain of the variable gain amplifier MVGA is lowered, the gain of the variable gain amplifier IVGA is raised. The output of the amplitude loop is supplied to a control circuit or controller 432 for a power supply voltage Vdd lying in the power module 430, which in turn controls power supply voltages for power amplifiers 431a and 431b to thereby make it possible to control their output power to a desired level. The power amplifier 431a is a signal amplifier for the GSM system, and the power amplifier 431b is a signal amplifier for each of the DCS and PCS systems.

The startup and band selection of the RF-PLL, the startup and band selection of the TX-PLL, DC offset calibration of each PGA and timings for switching of the loop bands in the RF-PLL in the RF IC of FIG. 1 in which the fractional PLL of FIG. 2 is used as the RF-PLL circuit which generates a carrier wave signal upon each of transmission and reception, will next be explained using FIG. 10. Control on the inside of the RF IC is performed in accordance with the timings shown in FIG. 10 is performed by a control signal generated by supplying a predetermined command from the baseband IC 300 to the control circuit 260 and allowing the control circuit 260 to decode the command.

When the power of the system is turned on, the supply of the power to the RF IC (200) is started. A command corresponding to, for example, "Word4" for providing instructions to the reset of its inside is supplied from the baseband IC (300) to the RF IC after the power is up. In doing so, the circuits such as the register, etc. lying inside the RF IC are respectively brought to a reset state by the control circuit (260), so that the RF IC enters an idle mode (sleep state indicative of waiting for a command) (timing t1 in FIG. 10).

Figure 10:
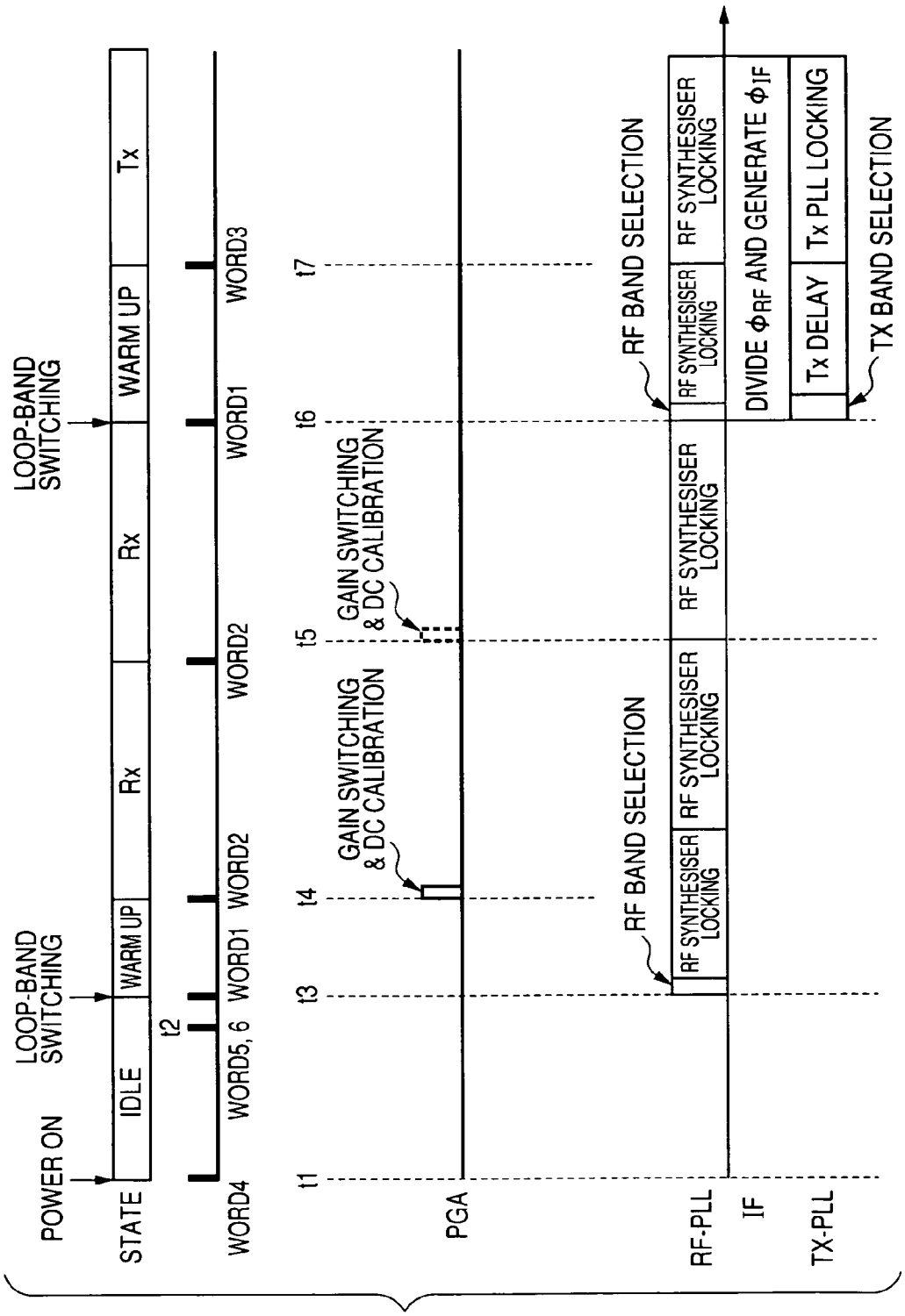
FIG. 10 is a timing chart showing a procedure for mode control on the RF IC of the embodiment, the start-up of the PLL circuit and calibration of GPA.
Figure 11:
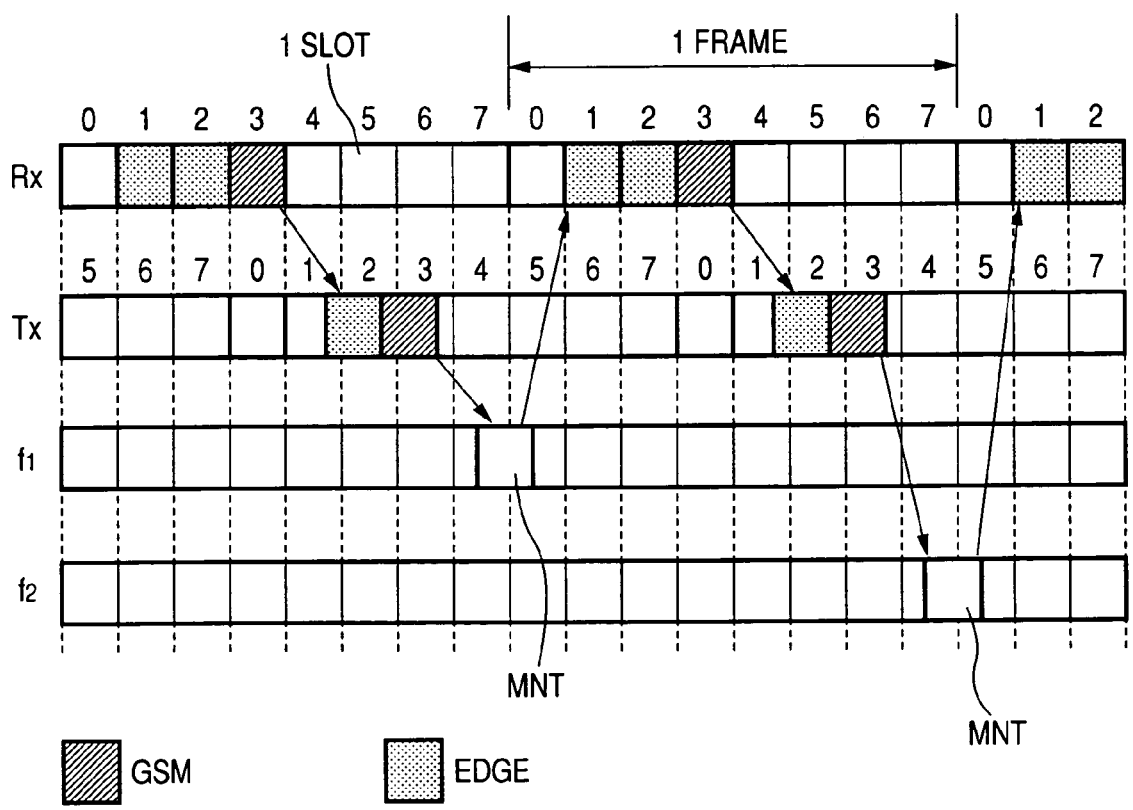
FIG. 11 is an explanatory diagram showing a configurational example of a transmission/reception frame in an RF IC of a GSM system.

Thereafter, after a suitable time interval has elapsed, the baseband IC sends "Word5 and 6" for instructing an initial setting (timing t2 in FIG. 10). In doing so, the control circuit 260 initially sets the inside of the RF IC for the purpose of transmitting and receiving operations.

When the present initial setting is completed, a command "Word1" including frequency information on channel to be used is supplied from the baseband IC to the RF IC. The control circuit 260 enters a warm up mode "Warm up" for starting the RF-VCO (timing t3 in FIG. 10). A bit for instructing transmission or reception is also contained in the command. The control circuit 260 performs switching (e.g., 40 KHz to 80 KHz) for widening the loop band of the RF-PLL and performs the operation of selecting a band used for the RFVCO (261) on the basis of the frequency information from the baseband, according to the bit upon reception. Then, the RFVCO is caused to perform an oscillating operation to bring the RF-PLL loop to a locked state.

Thereafter, when a command "Word2" for instructing a receiving operation is sent from the baseband IC, the control circuit 260 enters a receiving mode "Rx" and performs switching of the gain of each PGA in the reception-system circuit and DC-offset calibration at its head. Thereafter, the control circuit 260 starts up the low noise amplifiers 210 and the mixers 212 on the receiving side to enable amplification and demodulation of a receive signal (timing t4 in FIG. 10). When the reception of 1 slot is completed and the next slot is also received, a command "Word2" for instructing a receiving operation is sent again from the baseband IC. When, at this time, the received data is changed from GSMK modulation data in the GSM mode to 8PSK modulation data in the EDGE mode or changed vice versa, the switching of the gain of each PGA and DC-offset calibration are performed (timing t5 in FIG. 10). The loop band is not switched. When the received slot is continuous and no mode change is made to the received data, a code for instructing the switching of the gain of each PGA and the DC-offset calibration is not contained in the command "Word2". Therefore, the gain switching and calibration are not carried out. Even in this case, the switching for the loop band is not performed.

Next, when the reception mode "Rx" is completed and transition to a transmission mode "Tx" is done, a command "Word1" containing frequency information is supplied from the baseband IC (300), and the control circuit (260) enters the warm up mode "Warm up" for starting up the VCO again (timing t6 in FIG. 10). At this time, the RF synthesizer and the TX-PLL loop are brought to a locked state after the generation of a division ratio of the RFVCO, based on the frequency information (CH, T/R, NIF and BND) contained in the "Word1" and the operation of selecting bands used for the RFVCO and TXVCO have been performed according to the start of the warm up mode "Warm up" by the command "Word1", Thereafter, a "Word3" for instructing a transmitting operation is sent from the baseband IC 300 to the RF IC 200. When the control circuit 260 receives the "Word3" therein, it enters a transmitting mode after having performed switching (e.g., 80 KHz to 40 KHz) for narrowing the loop band of the RF-PLL, and causes a transmit signal to be modulated and amplified (timing t7 in FIG. 10). Also, the control circuit 260 performs even switching control on the switches SW1 and SW2 and the like according to the GSM or DCS/PCS at the head of the transmission mode. Incidentally, the receiving mode "Rx" and the transmitting mode "Tx" are respectively executed in time units (e.g., 577 μseconds) called time slots.

While the invention made above by the present inventors has been described specifically on the basis of the preferred embodiments, the present invention is not limited to the above. Although the embodiment shown in FIG. 2 by way of example shows the configuration in which the phase comparator 632 and the charge pump 633 constituting the RF-PLL are provided separately, the charge pump may be configured as an output stage of the phase comparator 632.

Although the above embodiment has explained the case in which the signal φIF of the intermediate frequency combined with the transmit I and Q signals by the mixers 233 for quadrature modulation is generated by dividing the oscillation signal φRF generated by the RFVCO 262 by means of the IF divider 264, the PLL circuit comprising the VCO for generating the signal φIF of the intermediate frequency and the synthesizer may be additionally provided to generate the signal.

Further, although the embodiment has explained the example in which the oscillator (DCXO) 261 for generating the signal φref used as the reference is formed on the same semiconductor chip as the transmission-system circuit and the reception-system circuit, the reference signal φref may be supplied from the outside of the chip. Although the transmission-system circuit according to the embodiment has shown one configured as the circuit of the stepup system which performs upconversion up to 80 MHz or so, based on the signal φIF of the intermediate frequency by means of the mixers 233 for quadrature modulation and thereafter performs upconversion up to 1 GHz or so by the TXVCO for transmission, the present invention can be applied even to the case in which the transmission-system circuit is configured of a circuit of a direct upconversion system.

Although the above description has principally been made of the case in which the invention made by the present inventors is applied to the high-frequency or RF IC employed in the wireless communication system like a cellular phone, which belongs to the field of application reaching the background of the invention, the present invention is not limited to it. The present invention can be applied to a high-frequency or RF IC for wireless LAN and other RF IC having a PLL circuit which generates a high frequency signal combined with a receive signal or a transmit signal to perform frequency conversion and modulation/demodulation.

What is claimed is:

1. A semiconductor integrated circuit for communication, comprising:
   a reception-system signal processing circuit;
   a transmission-system signal processing circuit;
   a down-convert mixer which combines a receive signal and a carrier wave signal;
   an up-convert mixer which combines a transmit signal and the carrier wave signal; and
   a PLL circuit common to transmission/reception, which includes a voltage-controlled oscillator and generates a carrier wave signal corresponding to a reception frequency and a transmission frequency and supplies the same to the two mixers,
   said semiconductor integrated circuit being operable in a first communication mode for transmitting and receiving signals subjected to phase modulation and amplitude modulation and a second communication mode for transmitting and receiving the signal subjected only to the phase modulation,
   wherein a frequency band of a loop for the PLL circuit is switched and set so as to be wider than a frequency band in a transmission mode in a reception mode and to be narrower than a frequency band in the reception mode in the transmission mode.

2. The semiconductor integrated circuit for communication according to claim 1, wherein when a first command indicative of either reception or transmission is supplied immediately before the start of any of a plurality of time slots continuous on a time basis in a frame comprising the time slots, an oscillation frequency of the voltage-controlled oscillator of the PLL circuit is set to a desired value, and when a second command for instructing a reception preparatory operation and a receive-signal process of the reception-system signal processing circuit is supplied, processing for canceling DC offsets in the reception-system signal processing circuit is executed during a predetermined period for the reception preparatory operation, the receive-signal process is started after the completion of the cancel processing, and instructions for allowing the frequency band of the loop for the PLL circuit in the reception mode to be broader than the frequency band of the loop for the PLL circuit in the transmission mode are received substantially simultaneously with the supply of the first command or prior to the supply of the first command.

3. The semiconductor integrated circuit for communication according to claim 2, wherein the PLL circuit includes a phase comparator which compares a difference in phase between a signal of a reference frequency and a feedback signal based on an oscillation signal generated by the voltage-controlled oscillator, and at least one loop filter which band-limits the frequency band of the loop, and the voltage-controlled oscillator oscillates at a frequency corresponding to a signal outputted from the loop filter.

4. The semiconductor integrated circuit for communication according to claim 3, wherein the PLL circuit is provided with a variable divider capable of dividing the oscillation signal generated by the voltage-controlled oscillator at a decimal division ratio, and a signal divided by the variable divider is fed back to the phase comparator.

5. The semiconductor integrated circuit for communication according to claim 4, further including a charge pump which outputs a current for charging up each capacitive element of the loop filter according to the phase difference detected by the phase comparator and a current for discharging each element according to the phase difference, wherein the value of each current of the charge pump is changed to alter the frequency band of the loop.

6. The semiconductor integrated circuit for communication according to claim 5, wherein the loop filter has capacitive elements, a plurality of resistive elements and switch elements capable of switching connected state of these resistive elements, and the resistive elements connected in the loop filter are switched upon the change of the frequency band of the loop with the change in the current value of the charge pump.

7. A terminal device for mobile communication, comprising:
   communication semiconductor integrated circuit formed defined in claim 2; and
   a second semiconductor integrated circuit formed with a baseband circuit,
   wherein the transmission or reception including the first communication mode and the second communication mode is done during the same time slots in the frame, a control signal for making the loop frequency band of the PLL circuit at reception broader than the loop frequency band thereof at transmission is supplied from the second semiconductor integrated circuit to the semiconductor integrated circuit for communication.

8. The semiconductor integrated circuit for communication according to claim 1, wherein the frequency band of the loop for the PLL circuit in the transmission mode is set so as to meet a predetermined transmission spectrum characteristic, and the frequency band of the loop for the PLL circuit in the reception mode is about twice the frequency band of the loop for the PLL circuit in the transmission mode.

9. The semiconductor integrated circuit for communication according to claim 8, wherein the frequency band of the loop for the PLL circuit in the transmission mode is about 40 KHz, and the frequency band of the loop for the PLL circuit in the reception mode is about 80 KHz.

10. The semiconductor integrated circuit for communication according to claim 1, further including a frequency divider which divides the oscillation signal generated by the PLL circuit into a signal of an intermediate frequency, wherein the transmission-system signal processing circuit combines a signal to be transmitted and the signal divided by the divider to perform upconversion up to the signal of the intermediate frequency and thereafter allows a transmitting oscillator to perform upconversion up to a transmit frequency.

11. The semiconductor integrated circuit for communication according to claim 10, wherein the transmission-system signal processing circuit includes aphase control loop which generates a phase-modulated signal and an amplitude control loop which generates an amplitude-modulated signal.

* * * * *